United States Patent
Han et al.

(10) Patent No.: US 11,341,010 B2
(45) Date of Patent: May 24, 2022

(54) DYNAMIC RECLAMATION OF STORAGE STRIPES

(71) Applicant: EMC IP Holding Company LLC, Hopkinton, MA (US)

(72) Inventors: Geng Han, Beijing (CN); Hongpo Gao, Beijing (CN); Jian Gao, Beijing (CN); Shuyu Lee, Acton, MA (US); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 16/743,643

(22) Filed: Jan. 15, 2020

(65) Prior Publication Data

US 2021/0216418 A1 Jul. 15, 2021

(51) Int. Cl.
*G06F 11/20* (2006.01)
*G06F 12/02* (2006.01)
*G06F 3/06* (2006.01)
*G06F 11/14* (2006.01)

(52) U.S. Cl.
CPC ........ *G06F 11/2094* (2013.01); *G06F 3/0617* (2013.01); *G06F 3/0644* (2013.01); *G06F 3/0652* (2013.01); *G06F 3/0689* (2013.01); *G06F 11/1458* (2013.01); *G06F 12/0246* (2013.01); *G06F 2201/81* (2013.01); *G06F 2212/1044* (2013.01)

(58) Field of Classification Search
CPC ............. G06F 11/1084; G06F 11/1088; G06F 11/1092; G06F 11/1458; G06F 11/1469; G06F 11/2094; G06F 2201/81; G06F 3/0617; G06F 3/0644; G06F 3/0652; G06F 3/0688; G06F 3/0689; G06F 12/0238; G06F 12/0246; G06F 2212/1016; G06F 2212/1032; G06F 2212/1044; G06F 2212/7205
See application file for complete search history.

(56) References Cited

U.S. PATENT DOCUMENTS 8,099,623 B1 * 1/2012 Li ....................... G06F 11/1084
                                                714/6.22
9,298,555 B1 * 3/2016 Ai ....................... G06F 11/1088
9,563,511 B1    2/2017 Foley et al.
(Continued)

*Primary Examiner* — Bryce P Bonzo
*Assistant Examiner* — Albert Li
(74) *Attorney, Agent, or Firm* — BainwoodHuang

(57) ABSTRACT

Techniques for rebuilding a failed drive of a plurality of drives are provided. The techniques include: (a) determining a number of empty data stripes that have been allocated from the plurality of drives; (b) applying a set of decision criteria to the determined number to yield a decision, wherein applying the set of decision criteria yields a first decision at a first time and a differing second decision at a second time; (c) in response to the first decision at the first time, deallocating an empty data stripe that was allocated from the plurality of drives to yield a plurality of data extents on disparate drives of the plurality of drives and continuing to rebuild the failed drive onto at least one of the plurality of data extents; and (d) in response to the second decision at the second time, pausing rebuilding the failed drive until applying the set of decision criteria yields the first decision.

19 Claims, 4 Drawing Sheets

(56) References Cited

U.S. PATENT DOCUMENTS

| | | | |
|---|---|---|---|
| 10,210,045 B1 | 2/2019 | Gao et al. | |
| 10,769,020 B2 | 9/2020 | Vankamamidi et al. | |
| 10,983,862 B2 | 4/2021 | Armangau et al. | |
| 11,099,954 B2 | 8/2021 | Gao et al. | |
| 2012/0151254 A1* | 6/2012 | Horn | G06F 11/108 |
| | | | 714/6.22 |
| 2017/0242785 A1* | 8/2017 | O'Krafka | G06F 3/0608 |
| 2019/0310916 A1* | 10/2019 | Patel | G06F 3/0653 |
| 2019/0391889 A1* | 12/2019 | Luo | G06F 3/0631 |
| 2020/0019464 A1* | 1/2020 | Barrell | G06F 13/1668 |
| 2020/0043524 A1* | 2/2020 | Roberts | G06F 3/06 |
| 2020/0133810 A1 | 4/2020 | Gao et al. | |

\* cited by examiner

DYNAMIC RECLAMATION OF STORAGE STRIPES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems store data across a plurality of drives using striping techniques, such as Redundant Array of Independent Disk (RAID) technology. Mapped RAID techniques allow stripes of N disk extents to be dynamically spread across M disks, M>N. Particular extents can be rearranged or rebuilt onto different disks as needed.

SUMMARY

Unfortunately, in a conventional storage system, failure of a disk can leave the system degraded. It is possible to keep a hot spare in a RAID configuration or a set of spare extents in a Mapped RAID configuration available for rebuilding in case a single disk fails. However, it is generally not efficient to reserve enough spares to deal with the failures of two or three or more drives. Nevertheless, even if space is not reserved, there may be space allocated to stripes which are actually empty. Some of those empty allocated stripes may, in fact, be necessary for garbage collection or other reasons. Thus, it may not be possible or advisable to use the extents of those empty allocated stripes to rebuild a failed drive onto once the spare extents have been exhausted.

Thus, it would be desirable to allow reclamation of already-allocated empty stripes for use in performing rebuilds. This may be accomplished by applying a set of decision criteria to decide whether to permit reclamation of already-allocated stripes, and reclaiming a stripe for use in rebuilding a failed drive only if the decision criteria permit doing so. In some embodiments, the decision criteria may balance the threat of future data loss due to not rebuilding against the need to prevent resource unavailability at the present due to a lack of sufficient allocated stripes to use for garbage collection and data intake.

In one embodiment, a method of rebuilding a failed drive of a plurality of drives is provided. The method includes (a) determining a number of empty data stripes that have been allocated from the plurality of drives; (b) applying a set of decision criteria to the determined number to yield a decision, wherein applying the set of decision criteria yields a first decision at a first time and a differing second decision at a second time; (c) in response to the first decision at the first time, deallocating an empty data stripe that was allocated from the plurality of drives to yield a plurality of data extents on disparate drives of the plurality of drives and continuing to rebuild the failed drive onto at least one of the plurality of data extents; and (d) in response to the second decision at the second time, pausing rebuilding the failed drive until applying the set of decision criteria yields the first decision. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for reclaiming already-allocated empty stripes for use in performing rebuilds. This result may be accomplished by applying a set of decision criteria to decide whether to permit reclamation of already-allocated stripes, and reclaiming a stripe for use in rebuilding a failed drive only if the decision criteria permit doing so. In some embodiments, the decision criteria may balance the threat of future data loss due to not rebuilding against the need to prevent resource unavailability at the present due to a lack of sufficient allocated stripes to use for garbage collection and data intake.

Figure 1:
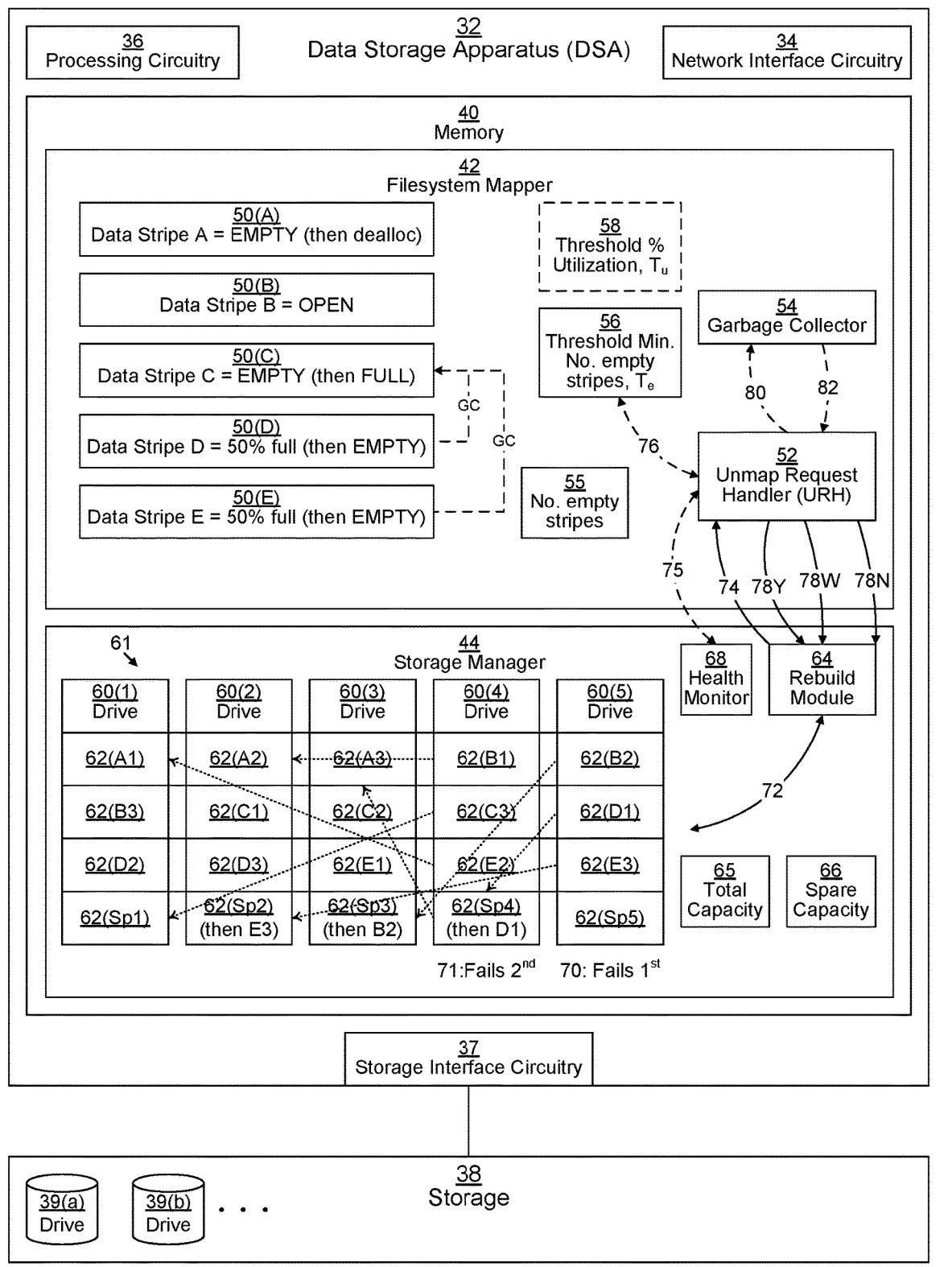
FIG. 1 is a block diagram depicting an example system, apparatus, and data structure arrangement for use in connection with various embodiments.

FIG. 1 depicts an example data storage environment (DSE) 30. DSE 30 may include one or more data storage apparatus (DSA) 32. Each DSA 32 may be any kind of computing device or collection (or cluster) of computing devices, such as, for example, a personal computer, workstation, server computer, enterprise server, data storage array device, laptop computer, tablet computer, smart phone, mobile computer, etc.

DSA 32 at least includes processing circuitry 36, storage interface circuitry 37, and memory 40. In some embodiments, a DSA 32 may also include network interface circuitry 34 as well as various other kinds of interfaces (not depicted). DSA 32 also includes interconnection circuitry.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices 39 (depicted as drives 39(a), 39(b), . . . ), such as, for example, hard disk drives, solid-state storage devices (SSDs), flash drives, NVMe drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows the DSA 32 to communicate with one or more host devices (not depicted) over the network.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a filesystem mapper 42, a storage manager 44, and other software modules (not depicted) which each execute on processing circuitry 36. In some embodiments, filesystem mapper 42 and storage manager 44 respectively constitute an upper layer and a lower layer of a multi-layered storage stack (not depicted).

Filesystem mapper 42 manages one or more filesystems or other data structures (not depicted), keeping track of both data and metadata (not depicted). The data may include user data, file data, etc. The metadata describes and keeps track of the data, as is well-known in the art. Data and metadata elements (not depicted) are stored within stripes 50 (depicted as stripes 50(A), 50(B), 50(C), 50(D), 50(E)). Each stripe 50 is stored on a set of drives 39, striped across various extents 62 on those drives 39. In some embodiments, filesystem mapper 42 manages a log-structured storage system, which places data blocks into stripes 50 as the data blocks are received for writing, keeping track of the logical placement of the various data blocks within one or more filesystems using the metadata elements, which are also placed into one or more stripes 50.

Storage manager 44 manages one or more redundancy groups 61. A redundancy group 61 is a logical grouping of drives 60 (each drive 60 logically representing a particular physical drive 39 of persistent storage 38) from which stripes 50 are drawn and provided to the filesystem mapper 42. Each drive 60 is logically divided into a set of extents 62. Typically, each extent 62 is a logically-contiguous set of storage locations within the underlying drive 39. Each extent 62 is typically the same size within any given redundancy group 61. In some embodiments, each extent 62 is 4 gigabytes, although this is by way of example only; in other embodiments, an extent 62 may larger or smaller. For example, an extent 62 may be as small as one sector (e.g., 512 bytes) or one block (e.g., 4 or 8 kilobytes). Although each drive 60 is depicted as having the same number of extents 62, this is by way of example only—different drives 60 may have different numbers of extents 62 therein.

Each redundancy group 61 may expose stripes 50 belonging to one or more pools. Thus, for example, a redundancy group 61 may expose some stripes 50 that are RAID-1 mirrors, other stripes 50 that are 4+1 RAID-5 groups, and yet other stripes 50 that are 9+1 RAID-5 groups, using principles of Mapped RAID (i.e., RAID implemented across extents 62 in a dynamic manner). For simplicity, all stripes 50 depicted are of the same type. As depicted, each stripe 50 has a 2+1 RAID-5 configuration made up of three storage extents 62. Thus, initially, stripe 50(A) is made up of extents 62(A1), 62(A2), and 62(A3); stripe 50(B) is made up of extents 62(B1), 62(B2), and 62(B3); stripe 50(C) is made up of extents 62(C1), 62(C2), and 62(C3); stripe 50(D) is made up of extents 62(D1), 62(D2), and 62(D3); and stripe 50(E) is made up of extents 62(E1), 62(E2), and 62(E3).

Various extents 62 (e.g., extents 62(Sp1), 62(Sp2), 62(Sp3), 62(Sp4), and 62(Sp5) in FIG. 1) may be spares that are not initially allocated to any stripe 50, although they may become allocated to various stripes due to failure events, as discussed below.

Storage manager 44 may also include a rebuild module 64 and a health monitor module 68, which also execute on processing circuitry 36. Rebuild module 64 operates to manage rebuilding extents 62 from drives 62 that have failed, while health monitor 68 operates to monitor the health of the various drives 60. Drive health may be measured in various ways using techniques known in the art. For example, in some embodiments, it may be measured by recording a frequency of read errors and/or write errors. Storage manager 44 may also include a store of the total capacity 65 and spare capacity 66 of all the (non-failed) drives 60 in each redundancy group 61. In some embodiments, these capacities 65, 66 may be measured in units of extents 62.

Filesystem mapper 42 may also include an unmap request handler (URH) module 52 and a garbage collector module 54, which also execute on processing circuitry 36. URH 52 operates to respond to requests from the rebuild module 64 to return an empty stripe 50 for reclamation for rebuilding. Garbage collector 54 operates to combine contents of stripes 50 that are less than full in order to create more stripes 50 that are empty. Filesystem mapper 42 may also include a store of a number 55 of empty stripes 50 allocated to the filesystem mapper 42, a threshold minimum number 56 ($T_e$) of empty stripes 50, and a threshold percent utilization 58 ($T_u$).

Memory 40 may also store various other data structures used by the OS, filesystem mapper 42, storage manager 44, URH 52, garbage collector 54, rebuild module 64, health monitor 68, and various other applications.

In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the DSA 32 is powered off. The OS, applications, filesystem mapper 42, storage manager 44, URH 52, garbage collector 54, rebuild module 64, and health monitor 68 are typically stored in this persistent storage portion of memory 40 or on persistent storage 38 so that they may be loaded into a system portion of memory 40 upon a system restart or as needed. The filesystem mapper 42, storage manager 44, URH 52, garbage collector 54, rebuild module 64, and health monitor 68, when stored in non-transitory form either in the volatile portion of memory 40 or on persistent storage 38 or in persistent portion of memory 40, each form a computer program product. The processing circuitry 36 running one or more applications thus forms a specialized circuit constructed and arranged to carry out the various processes described herein.

In example operation, in response to a failure event 70 of a first drive 60(5), rebuild module 64 performs a rebuild operation 72 on the redundancy group 61 of drives 60. Since drive 60(5) had three non-spare extents 62(B2), 62(D1), and 62(E3) thereupon, those three extents 62(B2), 62(D1), 62(E3) are rebuilt onto spare extents on the remaining drives 60(1)-60(4). Since there are four spare extents 62(Sp1), 62(Sp2), 62(Sp3), 62(Sp4) on those drives 60(1), 60(2), 60(3), 60(4), respectively, there are enough spares to perform the rebuild operation 72 without need to obtain additional spares. Thus, as depicted, rebuild module 64 rebuilds the contents of extent 62(B2) onto extent 62(Sp3), the contents of extent 62(D1) onto extent 62(Sp4), and the contents of extent 62(E3) onto extent 62(Sp2).

Subsequently, if drive 60(4) also fails (failure event 71) before drive 60(5) can be replaced, then rebuild module 64 is not able to rebuild all four extents 62(B1), 62(C3), 62(E2), and 62(Sp4→D1) of drive 60(4) because there is only one remaining spare extent 62(Sp1). Thus, rebuild module 64 issues an unmap request 74 to URH 52 to see if a stripe 50 can be reclaimed from the filesystem mapper 42.

In some embodiments, URH 52 communicates 75 with health monitor 68 to obtain health information about the remaining drives 60(1)-60(3), using that information to update 76 the threshold minimum number 56. For example, if it appears that one or more of drives 60(1)-60(3) is likely to fail imminently, then the threshold minimum number 56 may be decreased.

URH 52 responds to the request 74 by updating the number 55 of empty stripes 62 and then comparing that number 55 to the threshold 56 to determine if the number 55 is greater than the threshold 56. As depicted in FIG. 1, initially only stripes 50(A) and 50(C) are empty. Thus, the number 55 is two.

In one embodiment, the threshold 56 ($T_e$) is equal to one, so since 2>1, the threshold 56 is greater. In response, URH 52 selects one of the empty stripes 50(A), 50(C) (in this case, selecting 50(A)) and sends an affirmative response 78Y back to rebuild module 64, indicating that stripe 50(A) is approved to be unmapped from filesystem manger 42 and reclaimed by storage manager 44. In response, rebuild module 64 is able to perform the rebuild operation 72 to rebuild the extents of drive 60(4). As depicted, rebuild module 64 rebuilds the contents of extent 62(B1) onto extent 62(A2), the contents of extent 62(C3) onto extent 62(Sp1), the contents of extent 62(E2) onto extent 62(A1), and the contents of extent 62(SP4→D1) onto extent 62(A3).

In other embodiments, the threshold 56 ($T_e$) may be equal to two, so since 2≤2, the threshold 56 is not greater. In one embodiment, URH 52 sends a negative response 78N back to rebuild module 64, indicating that no stripe 50 is approved to be unmapped from filesystem manger 42 and reclaimed by storage manager 44. In response, rebuild module 64 pauses the rebuild operation 72 of drive 60(4) at least until a different response 78 is received at a later time.

In another embodiment, in response to the threshold 56 being determined to not be greater than the number 55, URH 52 determines whether garbage collection can be performed to empty enough stripes 50 to satisfy the number 55 being greater than the threshold 56. In one embodiment, this may include combining a usage percentage of each non-empty stripe 50 and comparing it to the threshold 58 ($T_u$). Open stripe 50(B) may be excluded from this combination because the fact that it is open means that it is in the process of initially being filled, and it would not make sense to perform garbage collection thereupon. In another embodiment, determining whether garbage collection can be performed includes determining whether the number 55 of empty stripes 55 is large enough to support garbage collection of particular stripes 50 that are not empty. For example, as depicted, stripes 50(D), 50(E) are both 50% full, so they can be garbage collected together into a single stripe 50. Before that is done, however, URH 52 sends a WAIT response 78W back to rebuild module 64, indicating that although no stripe 50 is currently approved to be unmapped from filesystem manger 42 and reclaimed by storage manager 44, a stripe 50 is expected to be made available shortly. In response, rebuild module 64 temporarily pauses the rebuild operation 72 of drive 60(4) until response 78Y is issued shortly thereafter.

URH 52 also requests 80 garbage collector 54 to perform garbage collection. Garbage collector 54 then performs garbage collection to merge stripes 50(D), 50(E) into initially-empty stripe 50(C), thereby freeing up stripes 50(D), 50(E). Upon completion of this garbage collection, garbage collector 54 reports back 82 to URH 52, after which URH 52 updates the number 55 of empty stripes 50 to be three (since stripes 50(A), 50(D), 50(E) are now empty. Since 3>2, the threshold 56 is greater than the number 55, so URH 52 is able to send affirmative response 78Y back to rebuild module 64 to allow it to continue the rebuild operation 72 of drive 60(4).

Figure 2:
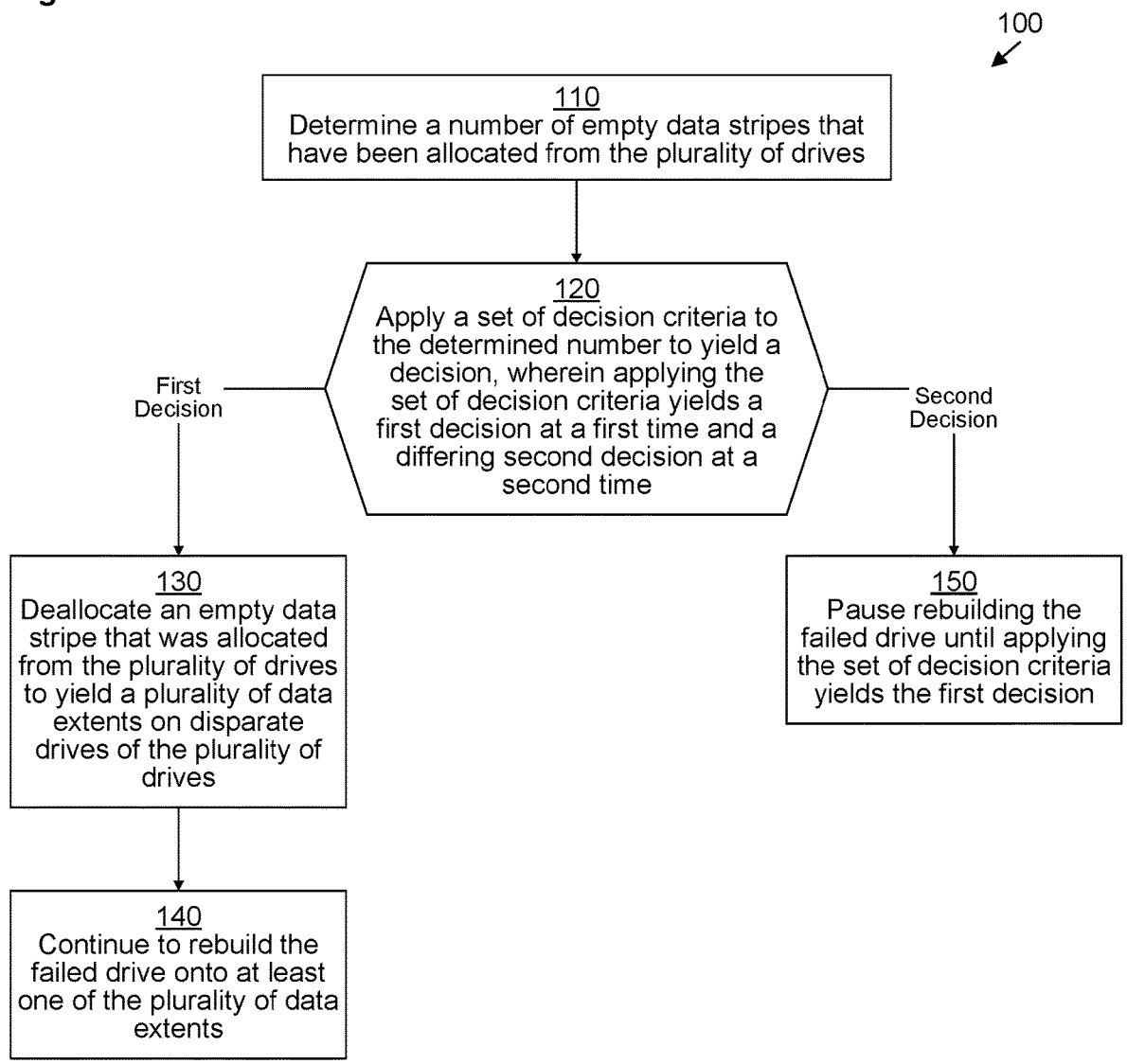
FIG. 2 is a flowchart depicting example methods of various embodiments.

FIG. 2 illustrates an example method 100 performed by DSA 32 for rebuilding a failed drive 60 of a plurality of drives 60 (e.g., redundancy group 61). It should be understood that any time a piece of software (e.g., filesystem mapper 42, storage manager 44, URH 52, garbage collector 54, rebuild module 64, health monitor 68) is described as performing a method, process, step, or function, what is meant is that a computing device (e.g., DSA 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order.

In step 110, DSA 32 determines a number of empty data stripes 50 that have been allocated from the plurality 61 of drives 60. In some embodiments, step 110 may be performed by URH 52 and the determined number is stored as number 55.

In step 120, DSA 32 applies a set of decision criteria to the determined number 55 to yield a decision, wherein applying the set of decision criteria yields a first decision at a first time and a differing second decision at a second time. For example, in one embodiment, applying the set of decision criteria yields a first (i.e., affirmative) decision if the number 55 exceeds the threshold 56 and a second (i.e., negative) decision if the number 55 does not exceed the threshold 56. In another embodiment (see FIG. 3), if the number 55 does not exceed the threshold 56, then either the second or a third (i.e., WAIT) decision is yielded, depending on the possibility of garbage collection.

In step 130, in response to the first (affirmative) decision, DSA 32 deallocates an empty data stripe 50 that was allocated from the plurality 61 of drives 60 to yield a plurality of data extents 62 on disparate drives 60 of the plurality 61 of drives 60. Thus, for example, stripe 50(A) may be deallocated to yield extents 62(A1), 62(A2), 62(A3) as new spares. Then, in step 140, DSA 32 continues to rebuild 72 the failed drive 60 onto at least one of the plurality of data extents 62 that was just deallocated.

In step 150, in response to the second (negative) decision, DSA 32 pauses rebuilding 72 the failed drive 60 at least until the set of decision criteria yields the first (affirmative) decision.

Figure 3:
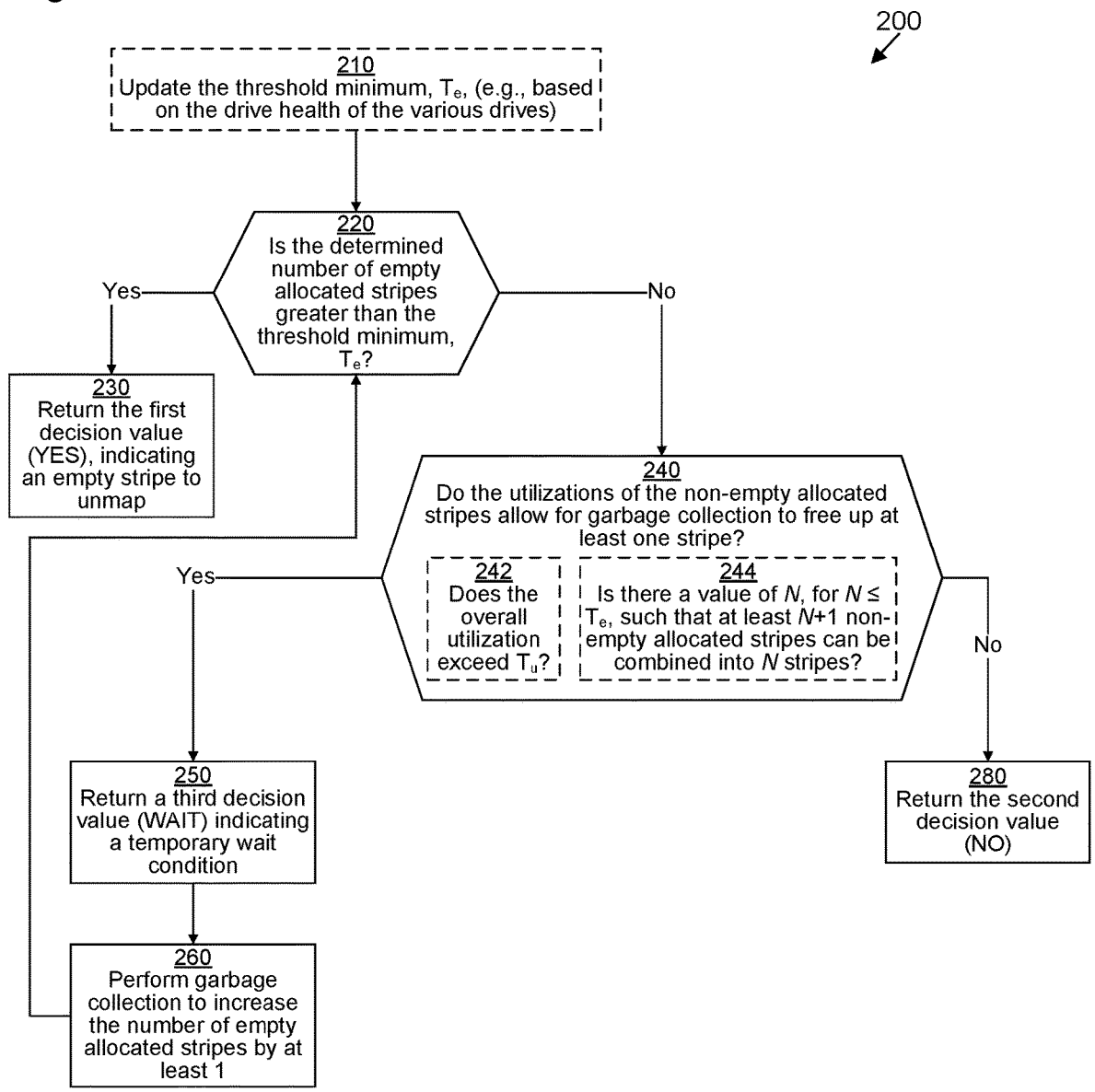
FIG. 3 is a flowchart depicting example methods of various embodiments.

FIG. 3 illustrates an example method 200 performed by filesystem manager 42 running on DSA 32 for applying a set of decision criteria to the determined number 55 to yield a decision regarding whether to allow an empty allocated stripe 50 to be deallocated and returned to the storage manager 44. It should be understood that one or more of the steps or sub-steps of method 200 may be omitted in some embodiments. For example, step 210 and sub-steps 242 and 244 are depicted with dashed lines, indicating that they are either optional or representative of alternative embodiments.

Similarly, in some embodiments, one or more steps or sub-steps may be combined together or performed in a different order. Method 200 is typically performed by URH 52. In some embodiments, method 200 may be used to implement step 120 of method 100.

In optional step 210, URH 52 updates the threshold 56. For example, this updating may be done based on drive health values received 75 from health monitor 68. Thus, in on embodiment, if any drive 60 of redundancy group 61 has a health value below a health threshold (not depicted), meaning that that drive 60 is expected to fail imminently, then URH 52 may decrease the threshold 56. On the other hand, if the health values of all of the drives 60 of the redundancy group 61 are high enough that imminent failure is extremely unlikely, then the threshold 56 may be returned to a default value. The default value of the threshold 56 may vary from system to system, but, in some embodiments, the threshold 56 may be set to equal or exceed a maximum number of stripes that may be needed for garbage collection. Thus, for example, one example garbage collection scheme attempts to combine the data of N stripes 50 into N−1 or fewer stripes 50. The maximum value of N (or N−1) that the garbage collector 54 is configured to use in garbage collection may be set as the threshold number 56 of empty stripes 50. In some embodiments, the maximum value of N may be configured to vary based on drive health. Thus, in one embodiment, N may be twenty when all drives 60 have perfect health, and N may drop to a value of one or two when most of the drives have health scores that indicate imminent failure, but when only one or two drive 60 have intermediate health scores that indicate that failure is likely to occur within several months, then N may be set to an intermediate value such as ten. In some embodiments, there may be a sliding scale.

In some embodiments, in which step 210 is omitted, the threshold number 56 is constant.

In step 220, URH 52 determines whether the number 55 of empty stripes 50 that are currently allocated to the filesystem manager 42 exceeds the threshold 56. If the number 55 exceeds the threshold 56, then operation proceeds with step 230, in which URH 52 returns an affirmative decision 78Y. A particular empty stripe 50 (e.g., stripe 50(A)) is selected for deallocation at this point as well.

If, however, the number 55 does not exceed the threshold 56, then operation proceeds with step 240, in which URH 52 goes on to determine whether or not the utilization ratios of the non-empty allocated stripes 50 would allow garbage collection to empty at least one more stripe 50. If not, then operation proceeds with step 280 in which URH 52 returns a negative decision 78N. Otherwise, operation proceeds with step 250.

In some embodiments, the question of step 240 may be answered by performing sub-step 242, in which it is asked whether the overall utilization ratio of all of the stripes 50 allocated to the filesystem mapper 42 exceeds the threshold utilization percentage 58, $T_u$. If the overall utilization exceeds $T_u$, then step 240 yields a negative result. Otherwise, step 240 yields an affirmative result, proceeding with step 250.

In other embodiments, the question of step 240 may be answered by performing sub-step 244, in which it is asked whether there a value of N, for $N \leq T_e$, such that at least N+1 non-empty allocated stripes 50 can be combined into N stripes 50? If sub-step 244 yields a negative result, then step 240 also yields a negative result. Otherwise, step 240 yields an affirmative result, proceeding with step 250.

In step 250, URH 52 returns an WAIT decision 78W indicating a temporary wait condition. Then, in step 260, URH 52 directs garbage collector 54 to perform garbage collection on the allocated stripes 50 to increase the number of empty allocated stripes 50 by at least one. After step 260 finishes, operation returns back to step 220.

Figure 4:
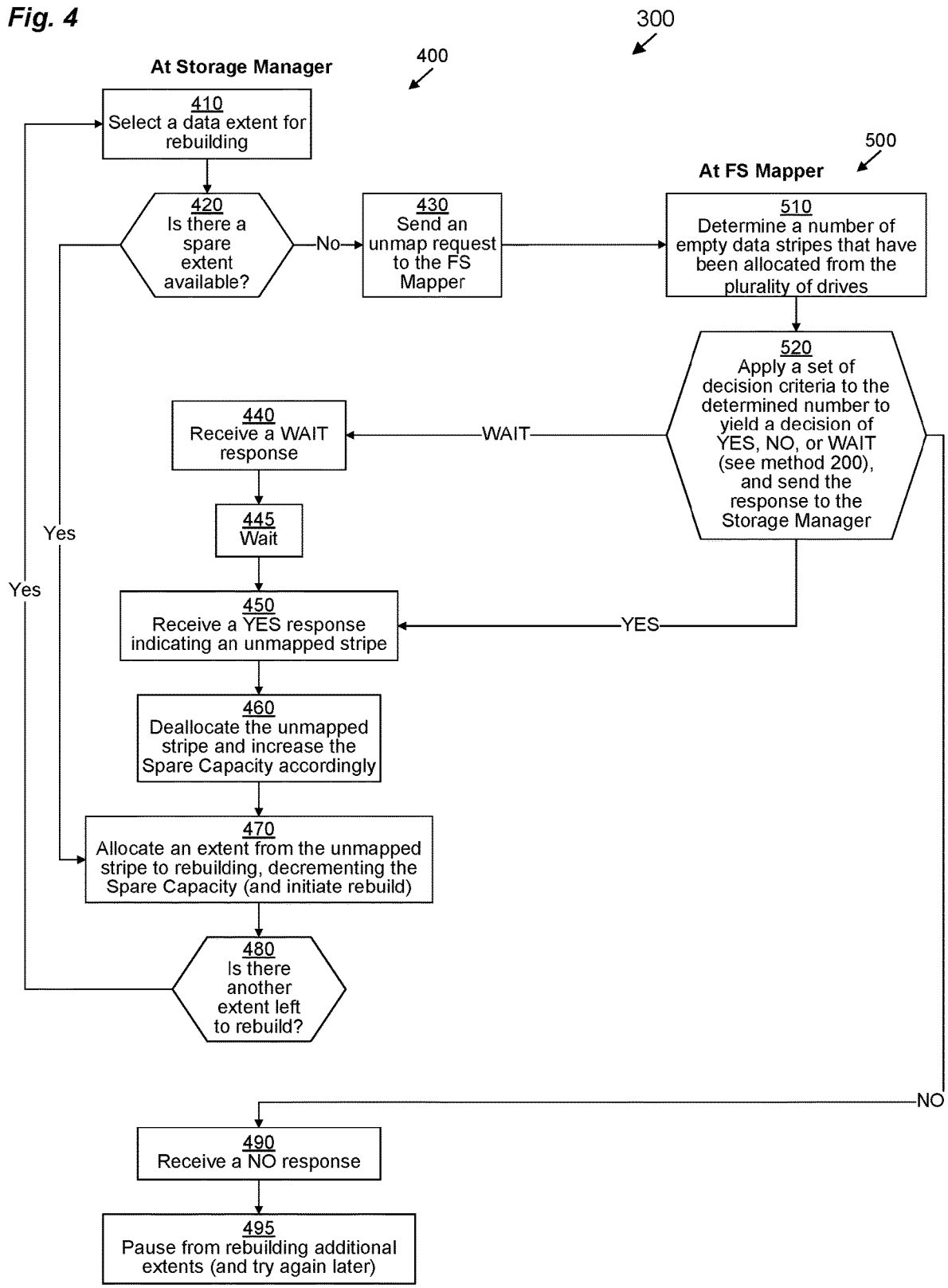
FIG. 4 is a flowchart depicting example methods of various embodiments.

FIG. 4 illustrates an example method 300 performed by DSA 32 for rebuilding a failed drive 60 of a plurality of drives 60 (e.g., redundancy group 61). Method 300 includes a method 400 performed by the storage manager 44 in conjunction with another method 500 performed by the filesystem mapper 42. It should be understood that one or more of the steps or sub-steps of methods 300, 400, 500 may be omitted in some embodiments. Similarly, in some embodiments, one or more steps or sub-steps may be combined together or performed in a different order.

Method 500 may be performed in response to a failure event 70, 71 in which a drive 60 of a redundancy group 61 fails (the drive 60 that fails hereinafter being referred to as the failed drive 60(X)). In some embodiments, method 500 does not begin until a waiting period (e.g., 5 minutes) elapses after the failure event 70, 71 without the failed drive 60(X) returning to service, in case the drive 60(X) that has failed has actually merely been restarted rather than failing catastrophically. Upon the failure event, rebuild module 64 may decrease the total capacity 65 value by the number of extents 62 that were on the failed drive 60(X).

In step 410, rebuild module 64 selects an extent 62 of the failed drive 60(X) to rebuild. Then, in step 420, rebuild module 64 determines whether or not an extent 62 that is spare (hereinafter referred to as a spare extent 62(Sp)), is available on one of the non-failed drives 60. If so, operation proceeds with step 470, below. Step 420 may include rebuild module 64 reading the spare capacity 66 value and checking if it is greater than zero.

If step 420 yields a negative result, then, in step 430, rebuild module 64 sends an unmap request 74 to the URH 52 of the filesystem mapper 42.

In response to receiving the unmap request 74, in step 510 URH 52 determines the number 55 of allocated stripes 50 that are empty. Then, in step 520, URH 52 applies a set of decision criteria to the determined number 55 to yield a decision 78 of YES 78Y, NO 78N, or WAIT 78W, sending the decision 78 back to the rebuild module 64 of the storage manager 44. Step 520 may include performing method 200 by URH 52.

In step 440, in response to the rebuild module 64 receiving a WAIT response 78W, rebuild module 64 waits (step 445) until it eventually receives a YES response 78Y in step 450.

In step 450, rebuild module 64 receives a YES response 78Y from URH 52, including an indication of a particular stripe 50 (hereinafter unmapped stripe 50(U)) that is to be reclaimed. In some instances, step 450 may follow step 445.

In response to step 450, in step 460, rebuild module 64 deallocates the unmapped stripe 50(U) from being allocated to the filesystem mapper 42. At this point rebuild module 64 increases the spare capacity 66 value by the number of extents 62 reclaimed from the unmapped stripe 50(U), then proceeding to step 470.

In step 470, rebuild module 64 allocates a spare extent 62(Sp) for rebuilding the selected extent 62 of the failed drive 60(X) (see step 410) onto, decrementing the spare capacity 66 value and initiating the rebuild of the selected extent 62 of the failed drive 60(X) onto the allocated spare extent 62(Sp). Then, in step 480, rebuild module 64 determines whether there is another extent 62 on the failed drive 60(X) for which rebuild has not yet begun. If so, operation proceeds back to step 410. Otherwise, method 400 (and 500) terminates. It should be understood that the rebuild of the individual extents 62 may continue after methods 400, 500 conclude.

In step 490, in response to the rebuild module 64 receiving a NO response 78N, rebuild module 64 pauses the rebuild (step 495), refraining from attempting to initiate a rebuild of any additional extents 62. It should be noted, however, that rebuild module 64 may still attempt to initiate method 400 again at a later time.

Thus, techniques have been presented for reclaiming already-allocated empty stripes 50 for use in performing rebuilds. This result may be accomplished by applying a set of decision criteria to decide whether to permit reclamation of already-allocated stripes 50, and reclaiming a stripe 50 for use in rebuilding a failed drive 60 only if the decision criteria permit doing so. In some embodiments, the decision criteria may balance the threat of future data loss due to not rebuilding against the need to prevent resource unavailability at the present due to a lack of sufficient allocated stripes 50 to use for garbage collection and data intake.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of rebuilding a failed drive of a plurality of drives, the method comprising:
    determining a number of empty data stripes that have been allocated from the plurality of drives;
    applying a set of decision criteria to the determined number to yield a decision, wherein applying the set of decision criteria yields a first decision at a first time and a differing second decision at a second time;
    in response to the first decision at the first time, deallocating an empty data stripe that was allocated from the plurality of drives to yield a plurality of data extents on disparate drives of the plurality of drives and continuing to rebuild the failed drive onto at least one of the plurality of data extents; and
    in response to the second decision at the second time, pausing rebuilding the failed drive until applying the set of decision criteria yields the first decision.

2. The method of claim 1,
    wherein determining the number and applying the set of decision criteria are performed by an upper-level mapping layer of a multi-layered storage stack; and
    wherein deallocating, continuing to rebuild, and pausing rebuilding are performed by a lower-level storage management layer of the multi-layered storage stack.

3. The method of claim 2 wherein the method further comprises:
    prior to determining the number and applying the set of decision criteria, beginning to rebuild, by the storage management layer, the failed drive onto data extents of the plurality of drives that were not part of any allocated data stripe; and
    determining the number and applying the set of decision criteria in response to the storage management layer exhausting the data extents of the plurality of drives that were not part of any allocated data stripe.

4. The method of claim 2 wherein applying the set of decision criteria to the determined number includes, in response to the mapping layer determining that none of the allocated empty data stripes can be spared by the mapping layer, further determining whether garbage collection of non-empty allocated data stripes would yield any additional allocated empty data stripes.

5. The method of claim 4 wherein yielding the second decision is performed in response to the mapping layer determining that garbage collection of non-empty allocated data stripes would not yield any additional allocated empty data stripes.

6. The method of claim 4 wherein the method further comprises:
    in response to the mapping layer determining that garbage collection of non-empty allocated data stripes would yield at least one additional allocated empty data stripe, yielding a third decision by the mapping layer;

in response to the third decision:
- sending a wait signal from the mapping layer to the storage management layer; and
- performing garbage collection by the mapping layer; and
- in response to the garbage collection generating a new empty allocated data stripe, sending the first decision to the storage management layer to continue to rebuild the failed drive using the new empty allocated data stripe.

7. The method of claim 1 wherein applying the set of decision criteria to the determined number includes:
- comparing the determined number to a threshold;
- at the first time, determining that the determined number exceeds the threshold and yielding the first decision in response; and
- at the second time, determining that the determined number does not exceed the threshold and yielding the second decision in response.

8. The method of claim 7 wherein the threshold is a fixed value representing a maximum number of stripes to which garbage collection can be applied at once.

9. The method of claim 7 wherein the method further comprises adjusting the threshold down in response to detecting that a health value of one of the plurality of drives has dropped below a health threshold.

10. A computer program product comprising a non-transitory computer-readable storage medium storing a set of instructions, which, when performed by a computing device, causes the computing device to rebuild a failed drive of a plurality of drives by:
- determining a number of empty data stripes that have been allocated from the plurality of drives;
- applying a set of decision criteria to the determined number to yield a decision, wherein applying the set of decision criteria yields a first decision at a first time and a differing second decision at a second time;
- in response to the first decision at the first time, deallocating an empty data stripe that was allocated from the plurality of drives to yield a plurality of data extents on disparate drives of the plurality of drives and continuing to rebuild the failed drive onto at least one of the plurality of data extents; and
- in response to the second decision at the second time, pausing rebuilding the failed drive until applying the set of decision criteria yields the first decision.

11. The computer program product of claim 10,
- wherein the set of instructions, when performed by the computing device, further cause the computing device to execute a multi-layered storage stack including an upper-level mapping layer of and a lower-level storage management layer;
- wherein determining the number and applying the set of decision criteria are performed by the upper-level mapping layer; and
- wherein deallocating, continuing to rebuild, and pausing rebuilding are performed by the lower-level storage management layer.

12. The computer program product of claim 11 wherein the set of instructions, when performed by the computing device, further cause the computing device to:
- prior to determining the number and applying the set of decision criteria, begin to rebuild, by the storage management layer, the failed drive onto data extents of the plurality of drives that were not part of any allocated data stripe; and
- determine the number and apply the set of decision criteria in response to the storage management layer exhausting the data extents of the plurality of drives that were not part of any allocated data stripe.

13. The computer program product of claim 11 wherein applying the set of decision criteria to the determined number includes, in response to the mapping layer determining that none of the allocated empty data stripes can be spared by the mapping layer, further determining whether garbage collection of non-empty allocated data stripes would yield any additional allocated empty data stripes.

14. The computer program product of claim 13 wherein yielding the second decision is performed in response to the mapping layer determining that garbage collection of non-empty allocated data stripes would not yield any additional allocated empty data stripes.

15. The computer program product of claim 13 wherein the set of instructions, when performed by the computing device, further cause the computing device to:
- in response to the mapping layer determine that garbage collection of non-empty allocated data stripes would yield at least one additional allocated empty data stripe, yielding a third decision by the mapping layer;
- in response to the third decision:
  - send a wait signal from the mapping layer to the storage management layer; and
  - perform garbage collection by the mapping layer; and
- in response to the garbage collection generating a new empty allocated data stripe, send the first decision to the storage management layer to continue to rebuild the failed drive using the new empty allocated data stripe.

16. The computer program product of claim 10 wherein applying the set of decision criteria to the determined number includes:
- comparing the determined number to a threshold;
- at the first time, determining that the determined number exceeds the threshold and yielding the first decision in response; and
- at the second time, determining that the determined number does not exceed the threshold and yielding the second decision in response.

17. An apparatus comprising:
- a plurality of non-transitory persistent storage drives; and
- processing circuitry coupled to memory configured to rebuild a failed drive of the plurality of drives by:
  - determining a number of empty data stripes that have been allocated from the plurality of drives;
  - applying a set of decision criteria to the determined number to yield a decision, wherein applying the set of decision criteria yields a first decision at a first time and a differing second decision at a second time;
  - in response to the first decision at the first time, deallocating an empty data stripe that was allocated from the plurality of drives to yield a plurality of data extents on disparate drives of the plurality of drives and continuing to rebuild the failed drive onto at least one of the plurality of data extents; and
  - in response to the second decision at the second time, pausing rebuilding the failed drive until applying the set of decision criteria yields the first decision.

18. The apparatus of claim 17,
- wherein determining the number and applying the set of decision criteria are performed by an upper-level mapping layer of a multi-layered storage stack; and
- wherein deallocating, continuing to rebuild, and pausing rebuilding are performed by a lower-level storage management layer of the multi-layered storage stack.

19. The apparatus of claim 17 wherein applying the set of decision criteria to the determined number includes:

comparing the determined number to a threshold;
at the first time, determining that the determined number exceeds the threshold and yielding the first decision in response; and
at the second time, determining that the determined number does not exceed the threshold and yielding the second decision in response.

\* \* \* \* \*